United States Patent
Bhandari et al.

(10) Patent No.: US 9,594,095 B2
(45) Date of Patent: Mar. 14, 2017

(54) SINGLE POINT OFFSET CALIBRATION FOR INERTIAL SENSORS

(71) Applicant: MCube, Inc., San Jose, CA (US)

(72) Inventors: Sanjay Bhandari, San Jose, CA (US); Joe Kelly, Center Point, IA (US)

(73) Assignee: mCube Inc., San Jose, CA (US)

( * ) Notice: Subject to any disclaimer, the term of this patent is extended or adjusted under 35 U.S.C. 154(b) by 773 days.

(21) Appl. No.: 13/936,117

(22) Filed: Jul. 5, 2013

(65) Prior Publication Data
US 2014/0012531 A1    Jan. 9, 2014

Related U.S. Application Data

(60) Provisional application No. 61/668,943, filed on Jul. 6, 2012.

(51) Int. Cl.
*G01P 21/00* (2006.01)
*G01C 25/00* (2006.01)

(52) U.S. Cl.
CPC ............ *G01P 21/00* (2013.01); *G01C 25/005* (2013.01)

(58) Field of Classification Search
CPC ....................................... G01P 21/00
USPC ........................................ 702/104
See application file for complete search history.

(56) References Cited

U.S. PATENT DOCUMENTS

| | | | |
|---|---|---|---|
| 8,676,528 B2 | 3/2014 | Almalki et al. | |
| 2009/0145195 A1* | 6/2009 | Buttmann | G01N 21/274 73/1.03 |
| 2010/0242603 A1* | 9/2010 | Miller | B81B 7/02 73/514.32 |
| 2013/0090881 A1* | 4/2013 | Janardhanan | G01C 22/006 702/104 |
| 2013/0218505 A1* | 8/2013 | Bhandari | G01C 25/005 702/104 |

OTHER PUBLICATIONS

Final Office Action for U.S. Appl. No. 13/760,014 dated Feb. 24, 2016 25 pages.
Non-Final Office Action for U.S. Appl. No. 13/760,014 dated Oct. 23, 2015 26 pages.

* cited by examiner

*Primary Examiner* — Bryan Bui
(74) *Attorney, Agent, or Firm* — Kilpatrick Townsend & Stockton LLP (57) ABSTRACT

A hand-held processor system for processing data from an integrated MEMS (Micro-Electro-Mechanical-Systems) device disposed within a hand-held computer system and methods therefor. The Single Point Offset Correction (SPOC) process computes offset values to calibrate MEMS sensors using a single set of data measurements at an orientation without dynamic perturbation, and without requiring advance knowledge of orientation of the device. Arbitrary output biases, which are known to be dominant on a single axis, can be corrected to ensure consistent performance. The SPOC process provides a simple method to effectively calibrate a MEMS sensor without requiring extensive system resources. This process can be enhanced by additional estimations of sensor offsets using the set of data measurements or by use of rule-based empirical gain factors.

14 Claims, 4 Drawing Sheets

SINGLE POINT OFFSET CALIBRATION FOR INERTIAL SENSORS

CROSS-REFERENCES TO RELATED APPLICATIONS

The present application claims priority to and incorporates by reference, for all purposes, U.S. Pat. App. No. 61/668,943, filed Jul. 6, 2012. The present application also incorporates by reference, for all purposes, U.S. patent application Ser. No. 13/760,014, filed Feb. 5, 2013.

BACKGROUND OF THE INVENTION

The present invention is directed to applications of integrated circuit (IC) and MEMS (Micro-Electro-Mechanical-Systems) devices. More specifically, embodiments of the invention provide methods for improving calibration techniques for integrated MEMS devices and related structures, which can be implemented in mobile phones, tablets, handheld computers, and the like. But it will be recognized that the invention has a much broader range of applicability.

Research and development in integrated microelectronics have continued to produce astounding progress in CMOS and MEMS. CMOS technology has become the predominant fabrication technology for integrated circuits (IC). MEMS, however, continues to rely upon conventional process technologies. In layman's terms, microelectronic ICs are the "brains" of an integrated device which provides decision-making capabilities, whereas MEMS are the "eyes" and "arms" that provide the ability to sense and control the environment. Some examples of the widespread application of these technologies are the switches in radio frequency (RF) antenna systems, such as those in the iPhone™ device by Apple, Inc. of Cupertino, Calif., and the Blackberry™ phone by Blackberry of Waterloo, Ontario, Canada, and accelerometers in sensor-equipped game devices, such as those in the Wii™ controller manufactured by Nintendo Company Limited of Japan. Though they are not always easily identifiable, these technologies are becoming ever more prevalent in society every day.

Beyond consumer electronics, use of IC and MEMS has limitless applications through modular measurement devices such as accelerometers, gyroscopes, actuators, and sensors. In conventional vehicles, accelerometers and gyroscopes are used to deploy airbags and trigger dynamic stability control functions, respectively. MEMS gyroscopes can also be used for image stabilization systems in video and still cameras, and automatic steering systems in airplanes and torpedoes. Biological MEMS (Bio-MEMS) implement biosensors and chemical sensors for Lab-On-Chip applications, which integrate one or more laboratory functions on a single millimeter-sized chip only. Other applications include Internet and telephone networks, security and financial applications, and health care and medical systems. As described previously, ICs and MEMS can be used to practically engage in various type of environmental interaction.

Although highly successful, ICs and in particular MEMS still have limitations. Similar to IC development, MEMS development, which focuses on increasing performance, reducing size, and decreasing cost, continues to be challenging. Additionally, applications of MEMS often require increasingly complex microsystems that desire greater computational power. Unfortunately, such applications generally do not exist. These and other limitations of conventional MEMS and ICs may be further described throughout the present specification and more particularly below.

From the above, it is seen that techniques for improving operation of integrated circuit devices and MEMS are highly desired.

BRIEF SUMMARY OF THE INVENTION

The present invention is directed to applications of integrated circuit (IC) and MEMS (Micro-Electro-Mechanical-Systems) devices. More specifically, embodiments of the invention provide methods for improving calibration techniques for integrated MEMS devices and related structures, which can be implemented in mobile phones, tablets, handheld computers, and the like. Merely by way of example, the MEMS devices can include at least one or more of an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

Inertial sensors, such as Accelerometers, should ideally sense the parameters of interest (Acceleration (also known as "specific force") in the case of Accelerometers) with no offset that would impair the acceleration measurement. However, several factors that include design aspects of accelerometers and their susceptibility to offset as a result of package and environmental stress conditions can result in non-zero offsets in accelerometers.

Embodiments of the present invention provide approaches to calibrate the offset of accelerometers based on a single point of measurement, if sufficient constraints can be placed on offsets of the X, Y, and Z axes. As an example, one constraint can be Xoff, Yoff<<Zoff, where Xoff, Yoff, and Zoff are offsets in measurement of acceleration in X, Y, and Z axes, respectively.

We can choose a time interval when the accelerometer component (device under test (DUT)/calibration) is not undergoing dynamic acceleration. The DUT can be subjected to static acceleration. For example, the static acceleration component from the Earth's gravity can be used for calibrating the accelerometer offset in some embodiments of the present invention. It is not necessary that the part be in any particular position (e.g. horizontal position) for the single point measurement or calibration. However, calibrating in certain positions can benefit in terms of accuracy of calibration.

Whether the DUT is in dynamic acceleration or not can be determined by monitoring existing X, Y, and Z sensor outputs and ensuring that there is no change in these 3 axes data at consecutive time domain data measurements.

Many benefits are achieved by the way of the present invention over conventional techniques. From a user perspective, the SPOC implementation can improve measurements to support high performance applications. A SPOC process can be intentionally triggered by the user, or it can run in the background. This allows flexibility for the user or manufacturer of the device to determine what is the best fit with the intended usage and performance requirements. The procedural impact of implementation would be quite low, since many users already expect to calibrate a mobile device's magnetometer via a series of movements to achieve peak accuracy. The SPOC process can also run in background where it will not need user to trigger calibration. The SPOC can "auto-detect" when the calibration conditions are met. Additionally, this process can be made to consume very low power, as only an initial calibration routine and then a very low duty cycle maintenance task can be used to improve accuracy over time. Further, the calibration conditions can be modified during use to achieve an acceptable combination of quickness in initial convergence and ultimate accuracy. From a developer perspective, this implementation in a device can result in lower cost, since no elaborate in-factory calibration is required. This would eliminate the need for putting each part in a known orientation and taking measurements. The device can work regardless of any source or cause of biases.

Various additional objects, features and advantages of the present invention can be more fully appreciated with reference to the detailed description and accompanying drawings that follow.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

The present invention is directed to applications of integrated circuit (IC) and MEMS (Micro-Electro-Mechanical-Systems) devices. More specifically, embodiments of the invention provide methods and structures for improving calibration techniques for integrated MEMS devices, which can be implemented in mobile phones, tablets, hand-held computers, and the like. Merely by way of example, the MEMS devices can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

Inertial sensors, such as Accelerometers, should ideally sense the parameters of interest (Acceleration (a.k.a. specific force) in the case of Accelerometers) with no offset that would impair the acceleration measurement. However, several factors that include design aspects of accelerometers and their susceptibility to offset as a result of package and environmental stress conditions can result in non-zero offsets in accelerometers.

Embodiments of the present invention provide approaches to calibrate the offset of accelerometers based on a single point of measurement, if sufficient constraints can be placed on offsets of the X, Y, Z axes. As an example, one constraint can be Xoff, Yoff<<Zoff, where Xoff, Yoff, and Zoff are offsets in measurement of acceleration in X, Y, and Z axes, respectively.

We can choose a time interval when the accelerometer component (device under test (DUT)/calibration) is not undergoing dynamic acceleration. The DUT can be subjected to static acceleration. For example, the static acceleration component from the Earth's gravity can be used for calibrating the accelerometer offset in some embodiments of the present invention. It is not necessary that the part be in any particular position (e.g. horizontal position) for the single point measurement or calibration. However, calibrating in certain positions can benefit in terms of accuracy of calibration.

Whether the DUT is in dynamic acceleration or not can be determined by monitoring existing X, Y, and Z sensor outputs and ensuring that there is no change in these 3 axes data at consecutive time domain data measurements.

In an embodiment, the present invention includes a microprocessor, microcontroller or computer implemented method for processing data from an integrated MEMS device disposed within a hand-held computer system programmed to perform the method. Calibration of sensor parameters, such as an accelerometer, and post-processing can be possible during normal operation. We can choose a time interval when there is no dynamic acceleration, as an accelerometer can sense when it is stationary regardless of orientation (e.g. it is not necessary that the device be in any particular position, such as horizontal, vertical, etc.). This static acceleration can be used for a Single Point Offset Calibration (SPOC) or Single Point Offset Correction process.

The calibration can include monitoring existing X, Y, Z sensor outputs and ensuring that there is no change in these 3 axes data at consecutive time domain data measurements. An offset calibration can be calculated using multiple measurements, which can be obtained dynamically during normal operation. In a specific embodiment, gravity will be the only force measured. Measuring gravity in at least four significantly different directions, and the X, Y, Z offsets on the force sensor can be estimated.

The present invention provides methods and structures for improving calibration techniques for inertial sensors. According to various embodiments of the present invention, the implementation of a Single Point Offset Calibration (SPOC) method can be summarized as follows:

1. Observe the measurements $X_m$, $Y_m$, and $Z_m$ from X, Y, and Z axes of an inertial sensor.
2. Denote the actual acceleration (with no offset as) as $X_a$, $Y_a$, $Z_a$.
3. $X_m = X_a + X_{off}$; $Y_m = Y_a + Y_{off}$; $Z_m = Z_a + Z_{off}$, where $X_{off}$, $Y_{off}$, and $Z_{off}$ are the offsets on X, Y, and Z axes of the inertial sensor measurement.
4. When there is no dynamic acceleration (in other words, when the part is not moving), $X_a^2 + Y_a^2 + Z_a^2 = 1\ g^2$, independent of orientation, where g=9.8 m/s$^2$ is acceleration due to earth's gravity, and could alternatively be computed as a varying function of user location if greater precision were required for a particular application.
5. Offset Dependent Error=1 $g^2 - (X_m^2 + Y_m^2 + Z_m^2)$.
6. Offset Dependent Error is Estimate of Squared Error due to offset related to 3 axes of the sensor and measurement path.
7. In an embodiment, the Z-offset is assumed to be the worst offset (among X, Y, and Z). Though the cause of this dominant error on Z is immaterial for the present invention, this particular example is based on fact that certain package stresses experienced by an accelerometer component would impact the Z-axis more than the X and Y axes. We can apply the significant correction based on Offset Dependent Error measured to Z while post-processing the Z axis measurement and achieve improved accuracy (lower offsets) on the part using the SPOC.

8. In the simplistic approach, devices with smaller Z offsets may get penalized if the offset is due to X and Y. However, on average Z-axis offsets are the worst and have the largest variations. With this simplistic approach, the average (or spread) of the Z offset can be brought to a lower value than if the SPOC were not applied.

Consider that at any time point where the dynamic acceleration is small or zero, $$X_{a1}^2 + Y_{a1}^2 + Z_{a1}^2 = 1\ g^2,$$

Where $X_{a1}$, $Y_{a1}$, and $Z_{a1}$ are actual accelerations at time instance 1 (with zero offset). Assuming $X_{off}$ and $Y_{off}$ are small leads to $$(X_{a1})^2 + (Y_{a1})^2 + (Z_{a1} - Z_{off})^2 = 1\ g^2,$$

For most consumer electronics and other devices where MEMS accelerometers will be used, it is likely that at power up, one data point will be obtained where there is no dynamic acceleration.

Using a single point for calibration, we can estimate Z offset ($Z_{off}$) with certain assumptions. $Z_{off}$ can be calculated in an iterative method in software or hardware. A binary decision tree can lead to the calculation of $Z_{off}$ within a few iterations. Alternatively, two direct solutions for $Z_{off}$ can be computed in closed form, with the most likely solution, based on assumed error distributions for the MEMS component, being selected for use in the correction.

Figure 1:
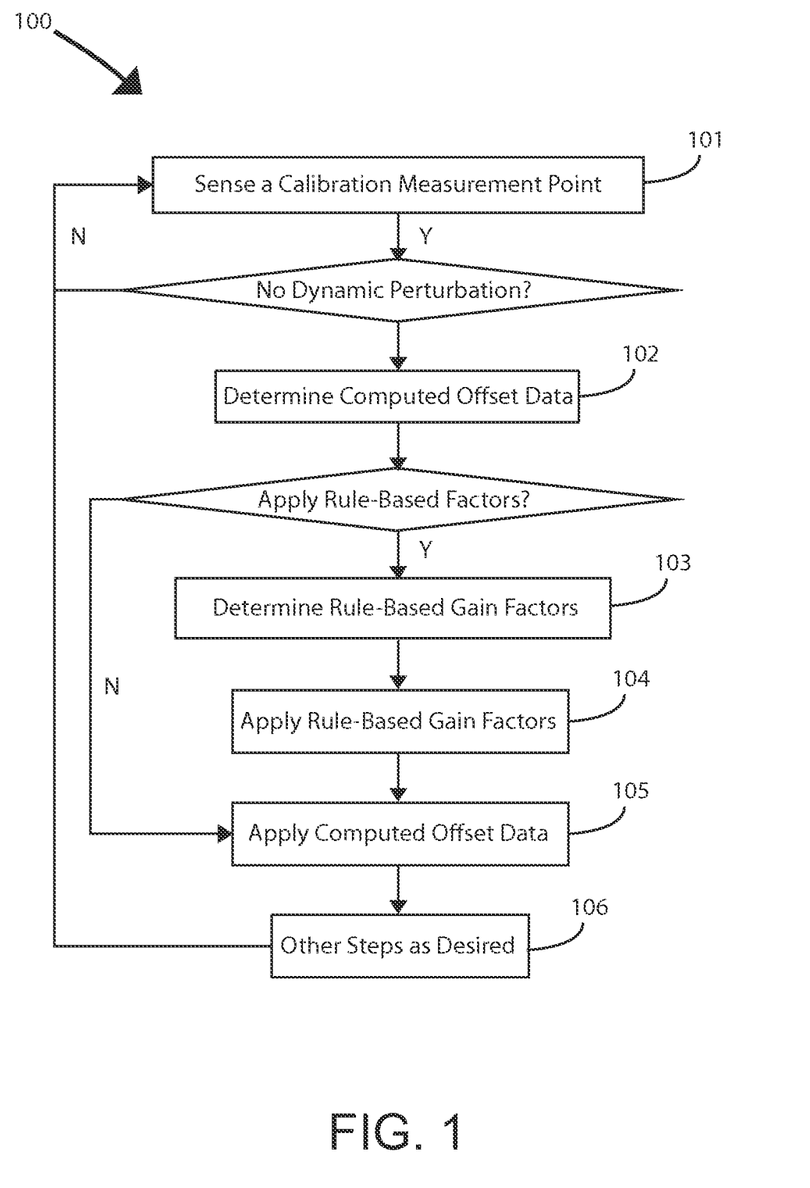
FIG. 1 is a simplified flow diagram of a method for calibrating an integrated MEMS device according to an embodiment of the present invention.

FIG. 1 is a simplified flow diagram of a method for calibrating an integrated MEMS device according to an embodiment of the present invention. In an embodiment, the present invention can include a micro-processor, on-chip logic, or software implemented method for processing data from a MEMS sensor disposed within a hand-held computer system programmed to perform the method. As shown, the method 100 can include the following steps:

101. Sense, by the MEMS sensor disposed within the computer system, a single calibration data measurement point, wherein the sensing of the single calibration data measurement point comprises sensing a set of X, Y, and Z axis sensor data in one static orientation without dynamic perturbation for a predetermined time period;

102. Determine, with a processor disposed within the computer system, computed offset data for the MEMS sensor through a Single Point Offset Correction (SPOC) process using the single calibration data measurement point, wherein the SPOC process includes determining an offset value of the computed offset data via the following equation: Offset=$1\ g^2 - (X_m^2 + Y_m^2 + Z_m^2)$, where g=9.8 m/s$^2$ or a more precise value if appropriate;

103. Determine rule-based empirical gain factors using the single calibration data measurement point;

104. Apply the rule-based empirical gain factors to the computed offset data;

105. Apply the computed offset data to the X, Y, or Z axis of the MEMS sensor; and 106. Other steps as desired.

These steps are merely examples and should not unduly limit the scope of the claims herein. One of ordinary skill in the art would recognize many other variations, modifications, and alternatives. For example, various steps outlined above may be added, removed, modified, rearranged, repeated, and/or overlapped, as contemplated within the scope of the invention.

Figure 2:
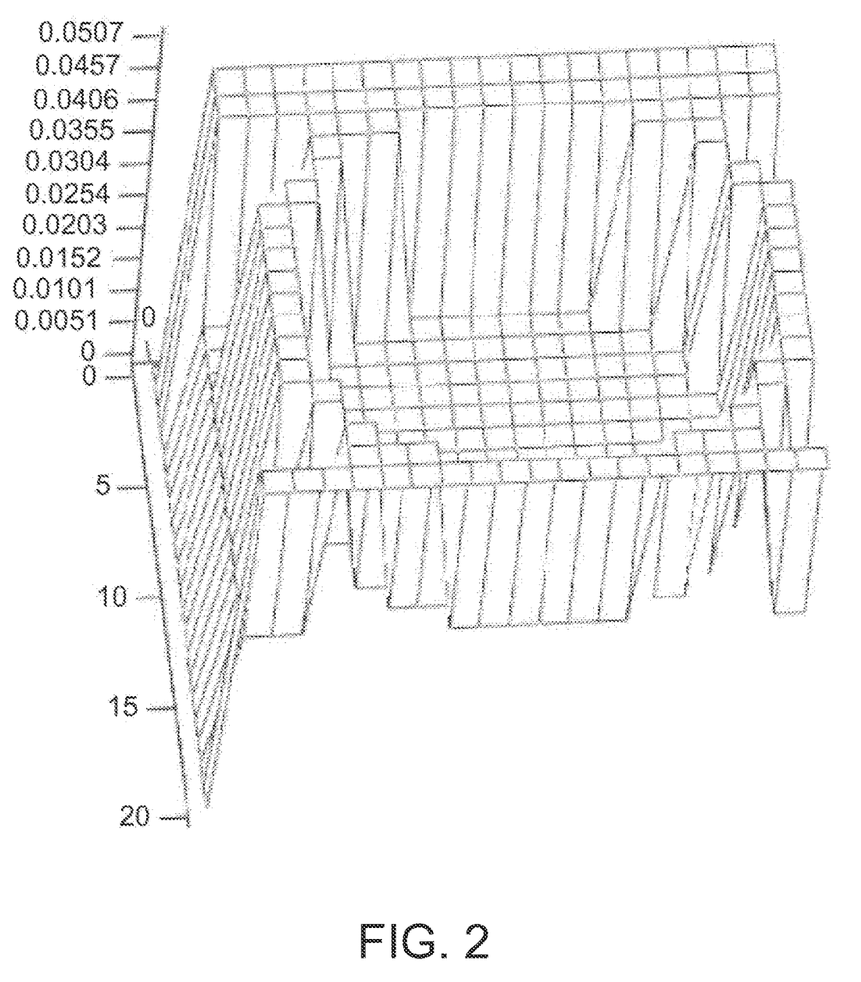
FIG. 2 is a simplified graph of errors in Z-offset (on the Z axis of the figure) when X & Y are held at different orientations in the space across the 3-D space at the time of calibration.

FIG. 2 is a simplified graph of errors in Z-offset (on the Z axis of the figure) when X & Y are held at different orientations in the space across the 3-D space at the time of calibration. If the X and Y offsets in the device are indeed small, then the simple algorithm leads to excellent offset cancellation. FIG. 1 shows the errors in Z offset (on the Z axis of the figure) when X and Y are held at different orientations in the space across the 3-D space at the time of calibration. Points 0-21 correspond to static accelerations of −1 g to +1 g through zero on X and Y axes. For this example, the original Z offset before calibration was 200 mg. As shown, in the majority of initial positions of the device in 3-D space, the calibration would provide great results. The worse errors are at X, Y, and Z accelerations of 1 g, 0, 0; −1 g, 0, 0; 0, 1 g, 0; 0, −1 g, 0. In this example, the error after the offset correction algorithm is applied is <46 mg.

If the offsets on the X and Y axis are significant, then the proposed algorithm will still provide good results in the trough in the center, but the error 'walls' will grow larger. In these cases, an embodiment of this invention involves applying 'rule-based' empirical gain factors that vary based on initial orientation that reflects initial values of acceleration on X, Y, and Z axes from the same single data point.

Figure 3:
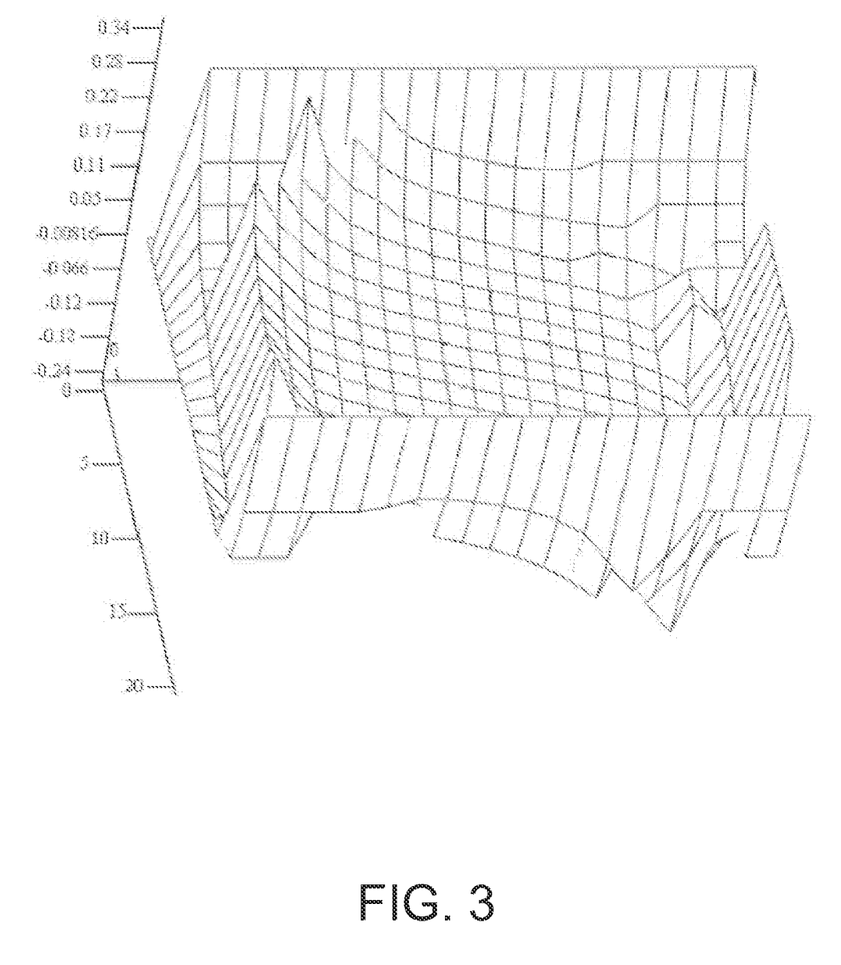
FIG. 3 is a simplified graph of residual error after Single Point Offset Correction is applied to Z-axis, when X and Y offsets are low.

FIG. 3 is a simplified graph of residual error after Single Point Offset Correction is applied to Z-axis, when X and Y offsets are low. For X and Y offsets of 100 mg and Z offset of 200 mg, the plot would be as shown below with the 'rule-based' algorithm. FIG. 2 shows residual errors after a Single Point Offset Correction is applied to the Z-axis, when X and Y offsets are low. The rules used for the empirical gain factor λ, which is used to scale the computed correction term before applying it to the output, are as shown below:

$\lambda = 0.75$ (default)

$= 0.5$ if ($|ym_{i,j}| > 0.75$ g OR $|xm_1| > 0.75$ g)

$= 0.9$ if $|zm_{i,j}| > 0.8$ g $= 0.25$ if ($|ym_{i,j}| > 0.9$ g OR $|xm_1| > 0.9$ g)

$= 0$ if ($|ym_{i,j}| > 0.97$ g OR $|xm_1| > 0.97$ g)

These empirical gain factors may also be scaled based on a prior estimates of the error statistics of offsets on other axes, which are in this example the terms $X_{off}$ and $Y_{off}$. The special case of $\lambda=0$ is used to recognize that there are some orientations where applying the correction is more likely to make the offsets grow larger, and the computed offset is thus unused for this subset of orientations.

In a specific embodiment, the present invention can include an enhanced single point calibration method. Access to additional information regarding X, Y, and Z acceleration and sensor electrodes during the same orientation of the part when the Xm, Ym, and Zm data are gathered would significantly improve the accuracy of the single point calibration. As an example, this additional information can be from self-test based actuation and measurements.

In the simplest usage of this data, if one can estimate the relative offsets on X, Y, and Z axes, then the accuracy of the single point calibration can be further improved. It may be possible to provide more weight to the self-test data based on its statistical accuracy in predicting offset and how it complements the rule-based algorithm.

In an embodiment, the present invention provides a hand-held computer system for processing data from an integrated MEMS device disposed within a hand-held computer system. The system can include a housing, a tangible memory for storing a plurality of executable instructions, an integrated MEMS device including a MEMS sensor disposed within the housing, and a processor disposed within the housing and coupled to the tangible memory and the integrated MEMS device. A sense module can be configured to sense via the MEMS sensor. A correction module can be configured for determining via the processor results of various computational processes as further described below. An offset data module can be configured to compute offset data via the processor through a Single Point Offset Correction (SPOC) process, which is further described below. The processor is programmed to perform a plurality of functions by the plurality of executable instructions. In various specific embodiments, these instructions can include:

- executable code that programs the processor to sense, by the MEMS sensor disposed within the computer system, a single calibration data measurement point
- executable code that programs the processor to determine, with a processor disposed within the computer system, computed offset data for the MEMS sensor through a (SPOC) process using the single calibration data measurement point
- executable code that programs the processor to sense, by the MEMS sensor, a set of X, Y, and Z axis sensor data in one static orientation for a predetermined time period; wherein the X, Y, and Z axis sensor data are denoted as $X_m$, $Y_m$, and $Z_m$, respectively
- executable code that that programs the processor to sense, by the MEMS sensor, the set of X, Y, and Z axis sensor data in a static orientation without dynamic perturbation
- executable code that programs the processor to determine an offset value of the computed offset data via the following equation: Offset=1 $g^2-(X_m^2+Y_m^2+Z_m^2)$, where g=9.8 m/s².
- executable code that programs the processor to apply the offset value to the Z axis of the MEMS sensor
- executable code that programs the processor to determine rule-based empirical factors using the single calibration data measurement point
- executable code that programs the processor to apply the rule-based empirical factors to the computed offset data and applying the computed offset data to the X, Y, or Z axis of the MEMS sensor
- executable code that programs the processor to initiate the SPOC process in response to a user performing a predetermined maneuver with the hand-held computer system
- executable code that programs the processor to initiate the SPOC process in response to a user performing, with the hand-held computer system, a motion of the user retrieving the hand-held computer system from a first user position, holding the computer system at a second user position, holding the computer system at a third user position, and then returning the computer system to the first user position
- executable code that programs the processor to run the SPOC process at one or more time points as a background SPOC process until predetermined calibration conditions are met
- executable code that programs the processor to run the SPOC process constantly as a background SPOC process until time period conditions, stationary conditions, geometric diversity conditions, or data limit conditions are met
- executable code that programs the processor to sense, by the MEMS sensor, user-initiated calibration data measurements as the user places the hand-held computer system on a level surface and presses a button, or as the user performs a FIG. 8 maneuver, and determining, by the processor, user-initiated computed offset data using the user-initiated calibration data measurements
- executable code that programs the processor to determine self-test based actuation and measurement information In a specific embodiment, the MEMS sensor can include a MEMS accelerometer, a MEMS gyrometer, or a MEMS inertial sensor, or the like. The integrated MEMS device can include an integrated 6-axis MEMS inertial sensing device including the MEMS accelerometer and a MEMS gyroscope. The integrated MEMS device can also include an integrated 6-axis MEMS inertial sensing device including the MEMS accelerometer and a Magnetometer or an integrated 9-axis or 10-axis inertial sensing device including the MEMS accelerometer and a MEMS gyroscope, a magnetometer, and a pressure sensor. There can be other variations, modifications, and alternatives.

In various embodiment, the present invention can include a microprocessor-implemented method for processing data from an integrated MEMS device disposed within a hand-held computer system programmed to perform the method. The following describes an embodiment of an enhanced dynamic offset correction or calibration (SPOC) process. Calibration of sensor parameters, such as an accelerometer, and post-processing can be possible during normal operation. We can choose a time interval when there is no dynamic acceleration, as an accelerometer can sense when it is stationary regardless of orientation (e.g. it is not necessary that the device be in any particular position, such as horizontal, vertical, etc.). This static acceleration can be used for a SPOC process.

The calibration can include monitoring existing X, Y, Z sensor outputs and ensuring that there is no change in these 3 axes data at consecutive time domain data measurements. An offset calibration can be calculated using multiple measurements, which can be obtained dynamically during normal operation. In a specific embodiment, gravity will be the only force measured. Using earth's gravity as a reference and measuring acceleration in at least four significantly different orientations of the device, we can estimate X, Y, Z offsets.

In an embodiment, X, Y, Z acceleration vectors ("measurement points") can be selected where the 'position' of the device is changed, implying 'static' acceleration in the X, Y, Z axes is different, but without dynamic acceleration, i.e where gravity is the dominant acceleration component being sensed by the device. This can be determined using state machines in hardware or software.

The calibration may be started right at power up. Averaging the $X_{off}$, $Y_{off}$, and $Z_{off}$ over time can lead to more accurate offset numbers. In some embodiments, while computing the offsets, if dynamic acceleration event happens it can be detected based on large changes in X, Y, or Z and that data point should not be used in the above computation. This calibration method can be tailored to function efficiently for various sensor data rates. For example, at a 256 Hz or higher polling rate, the calibration can require only a few milliseconds per measurement point, leading to adequate calibration in significantly less than one second. Conversely, slower data rates can also be used over larger spans of time to achieve very high accuracy offset estimates.

In a specific embodiment, the integrated MEMS device can include a 6-axis inertial sensor with a 3-axis gyroscope and a 3-axis accelerometer or a 3 axis accelerometer and 3 axis magnetometer. During a hand motion calibration (e.g. figure eight) for the gyroscope, the accelerometer can also be gathering data points for calibration or other processes. Other types of user-initiated calibration processes will be recognized by those of ordinary skill in the art.

In an alternative embodiment, a simple approach can be described as follows.

1. Read X, Y, Z. When there is no dynamic acceleration (the part is not moving), $X^2+Y^2+Z^2=1$ $g^2$ independent of orientation. Any delta with respect to 1 g is due to offsets of the 3 axes of the sensor and measurement path.
2. In a simple correction, if we assume that the Z-offset is the worst offset (does not necessarily mean it is the largest for all parts), we can apply the delta to Z while post-processing the Z-axis measurement.

Many benefits are achieved by the way of the present invention over conventional techniques. From a user perspective, the SPOC implementation can improve measurements to support high performance applications. A SPOC process can be intentionally triggered by the user, or it can run in the background. This allows flexibility for the user or manufacturer of the device to determine what is the best fit with the intended usage and performance requirements. The procedural impact of implementation would be quite low, since many users already expect to calibrate a mobile device's magnetometer via a series of movements to achieve peak accuracy. The SPOC process can also "auto-detect" when the calibration conditions are met. Additionally, this process can consume very low power, as only an initial calibration routine and then a very low duty cycle maintenance task can be used to improve accuracy over time. From a developer perspective, this implementation in a device can result in lower cost, since no elaborate in-factory calibration is required. This would eliminate the need for putting each part in a known orientation and taking measurements. The device can work regardless of any source or cause of biases.

Figure 4:
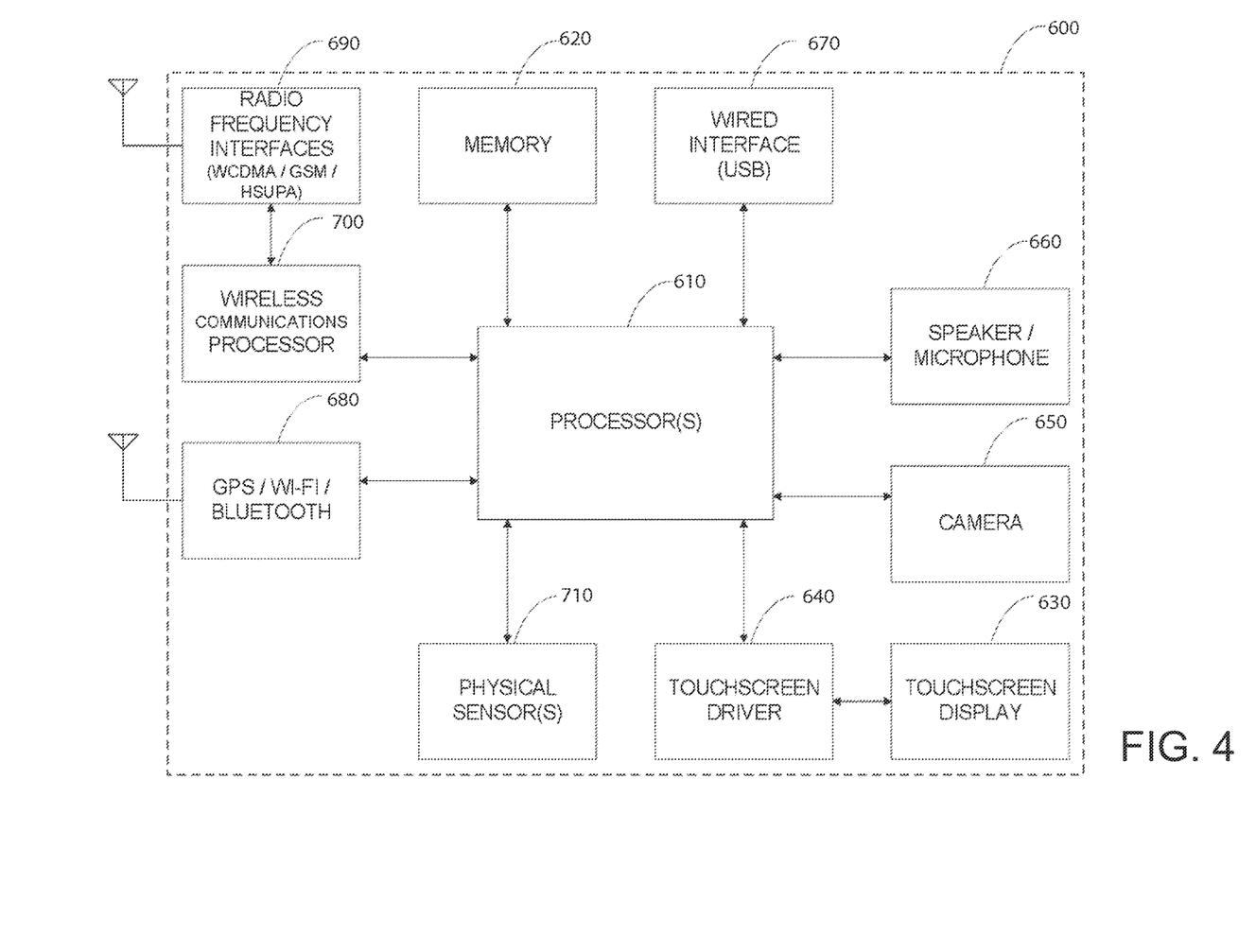
FIG. 4 illustrates a simplified functional block diagram of various embodiments of the present invention.

FIG. 4 illustrates a functional block diagram of various embodiments of the present invention. In FIG. 4, a computing device 600 typically includes an applications processor 610, memory 620, a touch screen display 630 and driver 640, an image acquisition device 650, audio input/output devices 660, and the like. Additional communications from and to computing device are typically provided by via a wired interface 670, a GPS/Wi-Fi/Bluetooth interface 680, RF interfaces 690 and driver 700, and the like. Also included in various embodiments are physical sensors 710.

In various embodiments, computing device 600 may be a hand-held computing device (e.g. Apple iPad, Apple iTouch, Dell Mini slate, Lenovo Skylight/IdeaPad, Asus EEE series, Microsoft Courier, Notion Ink Adam), a portable telephone (e.g. Apple iPhone, Motorola Droid, Google Nexus One, HTC Incredible/EVO 4G, Palm Pre series, Nokia N900), a portable computer (e.g. netbook, laptop), a media player (e.g. Microsoft Zune, Apple iPod), a reading device (e.g. Amazon Kindle, Barnes and Noble Nook), or the like.

Typically, computing device 600 may include one or more processors 610. Such processors 610 may also be termed application processors, and may include a processor core, a video/graphics core, and other cores. Processors 610 may be a processor from Apple (A4), Intel (Atom), NVidia (Tegra 2), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR -SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 620 may include different types of memory (including memory controllers), such as flash memory (e.g. NOR, NAND), pseudo SRAM, DDR SDRAM, or the like. Memory 620 may be fixed within computing device 600 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 630 and driver 640 may be based upon a variety of later-developed or current touch screen technology including resistive displays, capacitive displays, optical sensor displays, electromagnetic resonance, or the like. Additionally, touch screen display 630 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 650 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 660 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 610 to enable the user to operate computing device 600 by stating voice commands. Additionally, a speech engine may be provided in various embodiments to enable computing device 600 to provide audio status messages, audio response messages, or the like.

In various embodiments, wired interface 670 may be used to provide data transfers between computing device 600 and an external source, such as a computer, a remote server, a storage network, another computing device 600, or the like.

Such data may include application data, operating system data, firmware, or the like. Embodiments may include any later-developed or conventional physical interface/protocol, such as: USB 2.0, 3.0, micro USB, mini USB, Firewire, Apple iPod connector, Ethernet, POTS, or the like. Additionally, software that enables communications over such networks is typically provided.

In various embodiments, a wireless interface 680 may also be provided to provide wireless data transfers between computing device 600 and external sources, such as computers, storage networks, headphones, microphones, cameras, or the like. As illustrated in FIG. 2, wireless protocols may include Wi-Fi (e.g. IEEE 802.11 a/b/g/n, WiMax), Bluetooth, IR and the like.

GPS receiving capability may also be included in various embodiments of the present invention, however is not required. As illustrated in FIG. 4, GPS functionality is included as part of wireless interface 680 merely for sake of convenience, although in implementation, such functionality is currently performed by circuitry that is distinct from the Wi-Fi circuitry and distinct from the Bluetooth circuitry.

Additional wireless communications may be provided via RF interfaces 690 and drivers 700 in various embodiments. In various embodiments, RF interfaces 690 may support any future-developed or conventional radio frequency communications protocol, such as CDMA-based protocols (e.g. WCDMA), GSM-based protocols, HSUPA-based protocols, or the like. In the embodiments illustrated, driver 700 is illustrated as being distinct from applications processor 610. However, in some embodiments, these functionality are provided upon a single IC package, for example the Marvel PXA330 processor, and the like. It is contemplated that some embodiments of computing device 600 need not include the RF functionality provided by RF interface 690 and driver 700.

FIG. 4 also illustrates computing device 600 to include physical sensors 710. In various embodiments of the present invention, physical sensors 710 can be single axis or multi-axis Micro-Electro-Mechanical Systems (MEMS) based devices being developed by M-cube, the assignee of the present patent application. Physical sensors 710 can include accelerometers, gyroscopes, pressure sensors, magnetic field sensors, bio sensors, and the like. In other embodiments of the present invention, conventional physical sensors 710 from Bosch, STMicroelectronics, Analog Devices, Kionix or the like may be used.

In various embodiments, any number of future developed or current operating systems may be supported, such as iPhone OS (e.g. iOS), WindowsMobile (e.g. 7), Google Android (e.g. 2.2), Symbian, or the like. In various embodiments of the present invention, the operating system may be a multi-threaded multi-tasking operating system. Accordingly, inputs and/or outputs from and to touch screen display 630 and driver 640 and inputs/or outputs to physical sensors 710 may be processed in parallel processing threads. In other embodiments, such events or outputs may be processed serially, or the like. Inputs and outputs from other functional blocks may also be processed in parallel or serially, in other embodiments of the present invention, such as image acquisition device 650 and physical sensors 710.

FIG. 4 is representative of one computing or micro-processing device 600 capable of embodying the present invention. In one embodiment, the SPOC can be implanted on chip with sensors instead of using an external processor. The previously described methods of operation can be implemented with on-chip logic or through a micro-processor in the same device or in a separate chip within the hand-held device. It will be readily apparent to one of ordinary skill in the art that many other hardware and software configurations are suitable for use with the present invention. Embodiments of the present invention may include at least some but need not include all of the functional blocks illustrated in FIG. 4. For example, in various embodiments, computing device 600 may lack image acquisition unit 650, or RF interface 690 and/or driver 700, or GPS capability, or the like. Additional functions may also be added to various embodiments of computing device 600, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A micro-processor, on-chip logic, or software implemented method for processing data from a MEMS (Micro-Electro-Mechanical-Systems) sensor disposed within a hand-held computer system programmed to perform the method, the method comprising:
determining, by a user of the hand-held computer system, that the z-axis offset of the hand-held computer system is worse than the offsets in the x-axis and y-axis;
maintaining, by the user, the hand-held computer system in static position without dynamic perturbation;
sensing, by the MEMS sensor disposed within the computer system, a single calibration data measurement point by sensing a set of X, Y, and Z axis sensor data in one static orientation for a predetermined time period, wherein the X, Y, and Z axis sensor data are denoted as Xm, Ym, and Zm, respectively; and
determining, with a processor disposed within the computer system, computed offset data for the MEMS sensor through a Single Point Offset Correction (SPOC) process using the single calibration data measurement point, wherein the SPOC process comprises determining an offset value of the computed offset data via the following equation:

$$\text{Offset Dependent Error} = 1g^2 - (X_m^2 + Y_m^2 + Z_m^2),$$

where $g=9.8m/s^2$;
performing measurement using the MEMS sensor; and
applying the Offset Dependent Error to z-axis measurement data for offset correction.

2. The method of claim 1 wherein the one static orientation includes an orientation without dynamic perturbation.

3. The method of claim 1 further comprising applying the offset value to the a single axis of the MEMS sensor assumed to have the worst errors.

4. The method of claim 1 wherein the SPOC process comprises:
determining rule-based empirical gain factors using the single calibration data measurement point and a priori error statistic of an axis of the component; and
applying the rule-based empirical gain factors to the computed offset data and applying the computed offset data to the X, Y, or Z axis of the MEMS sensor.

5. The method of claim 1 wherein the SPOC process is configured as a background SPOC process that constantly runs until predetermined calibration conditions are met; wherein the predetermined calibration conditions include time period conditions, stationary conditions, or data limit conditions.

6. The method of claim 5 wherein time period conditions, stationary conditions, or data limit conditions are modified over time to improve accuracy after an initial period of convergence or completion using less stringent conditions.

7. The method of claim 1 wherein the MEMS sensor comprises a MEMS accelerometer, a MEMS gyrometer, or other MEMS inertial sensor.

8. The method of claim 1 wherein the SPOC process includes determining self-test based actuation and measurement information.

9. A hand-held inertial sensor system for processing data from an integrated MEMS (Micro-Electro-Mechanical-Systems) device disposed within the hand-held inertial sensor system, the system comprising:
a housing;
a tangible memory for storing a plurality of executable instructions;
an integrated MEMS device disposed within the housing, the integrated MEMS device including a MEMS sensor;
a processor disposed within the housing and coupled to the tangible memory and the integrated MEMS device, wherein the processor is programmed to perform a plurality of functions by the plurality of executable instructions;
wherein the plurality of executable instructions comprises:
executable code that programs the processor to sense, by the MEMS sensor disposed within the computer system, a single calibration data measurement point by sensing a set of X, Y, and Z axis sensor data in one static orientation for a predetermined time period without dynamic perturbation when the z-axis offset is worse than the offsets in the x-axis and y-axis, wherein the X, Y, and Z axis sensor data are denoted as Xm, Ym, and Zm, respectively;
executable code that programs the processor to determine, with the processor disposed within the computer system, computed offset data for the MEMS sensor through a Single Point Offset Correction (SPOC) process using the single calibration data measurement point, wherein the SPOC process comprises determining an offset value of the computed offset data via the following equation:

$$\text{Offset Dependent Error} = 1g^2 - (X_m^2 + Y_m^2 + Z_m^2),$$

where $g=9.8 m/s^2$; and
executable code that programs the processor to determine rule-based empirical gain factors using the single calibration data measurement point; and
executable code that programs the processor to apply the rule-based empirical factors to the computed offset data and applying the computed offset data to the X, Y, or Z axis of the MEMS sensor.

10. The system of claim 9 wherein the plurality of executable instructions comprises:
executable code that programs the processor to apply the offset value to the Z axis of the MEMS sensor.

11. The system of claim 9 wherein the plurality of executable instructions comprise:
executable code that programs the processor to initiate the SPOC process in response to a user, developer, or manufacturer command;
executable code that programs the processor to run the SPOC process constantly as a background SPOC process until time period conditions, stationary conditions, or data limit conditions are met, or
executable code that programs the processor to initiate the SPOC process.

12. The system of claim 9 wherein the plurality of executable instructions comprises executable code that programs the processor to determine self-test based actuation and measurement information.

13. A system for processing data from a MEMS (Micro-Electro-Mechanical-Systems) sensor disposed within a hand-held computer system, the system comprising:
a sense module configured for sensing, by the MEMS sensor disposed within the computer system, a single calibration data measurement point by sensing a set of X, Y, and Z axis sensor data in one static orientation for a predetermined time period without dynamic perturbation when the z-axis offset of the hand-held computer system is worse than the offsets in the x-axis and y-axis, wherein the X, Y, and Z axis sensor data are denoted as Xm, Ym, and Zm, respectively; and
a correction module configured for determining, with a processor disposed within the computer system, computed offset data for the MEMS sensor through a Single Point Offset Correction (SPOC) process using the single calibration data measurement point, wherein the SPOC process comprises determining an offset value of the computed offset data via the following equation:

$$\text{Offset Dependent Error} = 1g^2 - (X_m^2 + Y_m^2 + Z_m^2),$$

where $g=9.8 m/s^2$; and
the correction module configured for applying the offset value to the Z axis of the MEMS sensor.

14. The system of claim 13 wherein the correction module is configured to determine rule-based empirical factors via the SPOC process using the single calibration data measurement point; and
wherein the correction module is configured to apply the rule-based empirical gain factors to the computed offset data and apply the computed offset data to the X, Y, or Z axis of the MEMS sensor.

* * * * *